United States Patent
Skrna et al.

(10) Patent No.: US 11,163,295 B2
(45) Date of Patent: Nov. 2, 2021

(54) CONTINUOUS MACHINING WITH ROBOTIC TABLE TRACKING OF FIXTURE

(71) Applicant: Fanuc America Corporation, Rochester Hills, MI (US)

(72) Inventors: Paul Skrna, Lake Orion, MI (US); Min-Ren Jean, Rochester Hills, MI (US); William Lawson, Farmington Hills, MI (US); Bryan Thomas, Shelby Township, MI (US); Kyle Thornley, Allen Park, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 0 days.

(21) Appl. No.: 16/197,952

(22) Filed: Nov. 21, 2018

(65) Prior Publication Data

US 2020/0159192 A1 May 21, 2020

(51) Int. Cl.
*G05B 19/4155* (2006.01)

(52) U.S. Cl.
CPC ............ *G05B 19/4155* (2013.01); *G05B 2219/36088* (2013.01)

(58) Field of Classification Search
USPC .................................................... 700/159
See application file for complete search history.

(56) References Cited

U.S. PATENT DOCUMENTS

| | | | |
|---|---|---|---|
| 4,359,815 A | 11/1982 | Toyoda | |
| 4,612,697 A | 9/1986 | Palfery et al. | |
| 5,640,756 A | 6/1997 | Brown et al. | |
| 7,726,004 B2 | 6/2010 | Ooe et al. | |
| 11,097,484 B1* | 8/2021 | Snyder | B29C 64/393 |
| 2004/0179924 A1* | 9/2004 | Lundahl | B65G 59/02 |
| | | | 414/416.01 |
| 2008/0216451 A1* | 9/2008 | Stafford | B65B 5/10 |
| | | | 53/445 |
| 2011/0213497 A1* | 9/2011 | Nair | B25J 9/1666 |
| | | | 700/255 |
| 2012/0195718 A1 | 8/2012 | Grob | |
| 2017/0050282 A1* | 2/2017 | Kruck | B23Q 1/66 |
| 2018/0067467 A1* | 3/2018 | Okuzono | B25J 11/005 |
| 2019/0160616 A1* | 5/2019 | Maeda | B23Q 7/10 |

FOREIGN PATENT DOCUMENTS

| | | |
|---|---|---|
| CN | 103921158 A | 7/2014 |
| CN | 104723115 A | 6/2015 |

* cited by examiner

*Primary Examiner* — Mohammad Ali
*Assistant Examiner* — Joshua T Sanders
(74) *Attorney, Agent, or Firm* — Shumaker, Loop & Kendrick, LLP; John A. Miller

(57) ABSTRACT

A method and apparatus for controlling a continuous machining process includes a robot, a machining tool, a table, and a raw parts supply mounted inside a machining cell enclosure. The table has first and second vises for holding parts. The machining tool is operated to machine a raw part in one of the vises while the robot is operated to pick a machined part from the other vise and then place another raw part into the other vise. The table can be fixed or rotatable. The robot places the picked machined parts on an exit conveyor to remove the machined parts from the enclosure.

14 Claims, 4 Drawing Sheets

CONTINUOUS MACHINING WITH ROBOTIC TABLE TRACKING OF FIXTURE

FIELD OF THE INVENTION

This invention relates to a continuous machining process with robotic table tracking of a machining fixture for load/unload and/or other processes requiring synchronization.

BACKGROUND OF THE INVENTION

This section provides background information related to the present disclosure which is not necessarily prior art.

Parts machining cells typically include an enclosure in which a machining tool and a parts holding fixture mounted. When raw part held in the fixture has been processed into a machined part, a door of the enclosure is opened so that the machined part can be removed and another raw part loaded into the fixture. This parts exchange can be performed in any of several configurations including: by a robot external to the enclosure; exchanging a tombstone holding several of the raw parts; and a pallet changer also holding several of the raw parts. In each of these configurations, there is the disadvantage that the machining process must be stopped to exchange the parts.

A further disadvantage with these prior art configurations is that the enclosure door must be opened and closed adding to the time required for the exchange. These disadvantages result in a loss of production while machining tool stops running during part exchange.

U.S. Pat. No. 4,359,815 discloses a machining center equipped with an integral robot device having a manipulating hand capable of approaching a spindle of the machining center, a tool storing magazine mounted on a machine body, a workpiece supply table disposed on a floor in the vicinity of the machine body, and a work table of the machine body so that an exchange of cutting tools may be carried out by the manipulating hand between the tool storing magazine and the spindle, and so that an exchange of workpieces may also be carried out by the manipulating hand between the tool storing magazine and the work table.

U.S. Pat. No. 4,612,697 discloses an automated machine tool having a workpiece transfer apparatus that allows the machine tool to automatically load and unload a workpiece during machining. The automated machine tool has the capacity to select a workpiece from a stack of raw material, transfer the workpiece to a machining station, and select a new workpiece from the stack of raw material without human intervention.

U.S. Pat. No. 5,640,756 discloses an automated continuous manufacturing system which includes a rotatable work table having a plurality of work piece supports for maintaining work pieces during operation, and a plurality of work stations for performing cleaning, pretreatment, treatment or assembly tasks on work pieces secured to the work piece supports. Each of the tasks performed at the work table is performed at a respective work station. Certain of the work stations include a removable station subassembly for performing a specific task. The removable station subassemblies are removably engagable with the rotatable work table and can be replaced with an alternate removable station subassembly for performing a desired alternate task. One of the work stations is an assembly station engaged with the rotatable work table for receiving work pieces from their individual work piece supports. The assembly station further includes a removing subassembly for removing the work pieces from the work piece supports for further assembly. An orientation subassembly is also provided with the assembly station, and is mounted adjacent the removing subassembly by a quick change release member to enable easy removal and replacement with an alternate orientation subassembly. The orientation subassembly includes a position sensor for detecting the position of an alignment member of a work piece.

U.S. Pat. No. 7,726,004 B2 discloses a processing cell of an automatic machining system configured to be easy to change the number of steps and to design, and to reduce the installation cost. The control unit of the processing cell comprises an operation data storing means for storing every position necessary data for operation at each position of the processing cell installed in the machining section of the automatic machining system, and a position designating means for designating the after-installation position. The control unit reads necessary data for operation out of the operation data storing means in accordance with the position designated by the position designating means. Thus, the operation of each cell can be switched in accordance with the position, and the processing cells can be easily changed in position and adjusted in quantity.

U.S. Patent Application Publication No. 2012/0195718 A1 discloses a feed and load unit serving for feeding or removing one or more work pieces in the machining chamber of a machine tool for machining purposes. The feed and load unit comprises at least two work piece carriers movably on a guide path. The work piece carrier serves for picking up at least one work piece. In the guide path a guide path section, angularly or diagonally to the direction of conveying of the work pieces on the guide path, movably by a drive is, provided. The guide path section is able to pick up at least one work piece carrier. The guide path section is shifted for loading and unloading purposes in the direction of the machining chamber.

Chinese Patent Application Publication No. CN 103921158 A discloses a robot-based automatic feeding and discharging system comprising a mechanical portion and a control portion. The mechanical portion comprises a feeding unit, a column and beam unit, a lathe unit, a robot unit, a steering unit and a discharging unit. The feeding unit comprises a feeding workbench, a feeding servo motor, the feeding bench being provided with the feeding servo motor, and the output shaft of the feeding servo motor is connected to a feeding synchronous belt wheel through a feeding conveying belt. The lathe unit comprises a first lathe and a second lathe which are used for completing a first processing procedure and a second processing procedure in workpiece processing. The system is capable of arraying and accurately positioning workpieces according to a preset manner, clamping the workpieces to a numerically-controlled machine tool for processing through different procedures, and fetching the workpieces and placing into a finished product box after the processing is completed.

Chinese Patent Application Publication No. CN 104723115 A discloses a full-automatic robot-assisted machining production line which comprises a plurality of numerical-control machine tools, a robot-assisted device and a robot control box. The numerical-control machine tools are divided into two rows, the two rows of numerical-control machine tools are opposite to each other, the robot-assisted device is positioned between the two rows of numerical-control machine tools, and a feeding table and a discharging table are respectively arranged at two ends of the robot-assisted device. The full-automatic robot-assisted machining production line has the advantages that materials can be automatically fed and discharged for the two rows of sequentially arrayed numerical-control machine tools by the robot-assisted device, so that the purpose of controlling a plurality of production lines by a single person can be achieved, the production time can be greatly shortened, the production and machining efficiency can be improved, the labor intensity and the labor cost can be lowered, and various problems due to human factors can be effectively solved.

BRIEF SUMMARY OF THE INVENTION

In concordance with the instant disclosure, an apparatus and method for a continuous machining process wherein the exchange of parts is accomplished without opening the enclosure door or stopping the machining process has surprisingly been discovered.

The invention relates to a method of increasing the production rate of machined parts.

Placement of a robot inside of a machining cell enclosure eliminates the need to open the enclosure door to exchange parts. The method uses custom tracking software to monitor the positions of parts. Dual load/unload vises allow the robot to service one vise while a part is being machined in the other vise. Thus, machining at one vise continues while a part exchange is performed at the other vise. This method of operation reduces the time the machining tool isn't running while waiting for the part exchange.

The method for performing a continuous machining process, according to the invention, includes the steps of: mounting a robot inside an enclosure with a machining tool, a table rotatable between a first position and a second position, and a raw parts supply, the table having a first vise and a second vise for holding parts; operating the robot to pick a first raw part from the raw parts supply, to place the first raw part into the second vise when the table is in the first position and while the machining tool is machining a second raw part in the first vise, and to then move clear of the second vise; when the machining of the second raw part is complete thereby forming a machined part, rotating the table 180° to the second position; and while the machining tool is machining the first raw blank, operating the robot to pick the machined part from the first vise.

The method can include operating the robot to place the machined part picked from the first vise on an exit conveyor and operating the exit conveyor to remove the machined part from the enclosure. The method can further include operating the robot to place the first raw part in the second vise after the machining tool has completed a predetermined portion of a machining process on the second raw part. The method also can include operating the robot to move to a perch position after picking the first raw part and wait at the perch position until the machining tool has completed a predetermined portion of a machining process on the second raw part before placing the first raw part into the second vise.

The method steps of picking and placing the raw parts, machining the raw parts, rotating the table and picking the machined parts are repeated for a plurality of the raw parts to perform the continuous machining process.

The method for controlling a continuous machining process, according to the invention, includes the steps of: mounting inside an enclosure a robot, a machining tool, a table rotatable between a first position and a second position, and a raw parts supply, the table having a first vise and a second vise for holding parts; rotating the table to the first position with the first vise adjacent to the machining tool and the second vise adjacent to the robot; operating the machining tool to machine one raw part in the first vise; operating the robot to pick another raw part from the raw parts supply; operating the robot to place the another raw part into the second vise while the machining tool is machining the one raw part in the first vise, and to then move clear of the second vise; when the machining of the one raw part is complete thereby forming a machined part, rotating the table to the second position with the second vise adjacent to the machining tool and the first vise adjacent to the robot; and operating the robot to pick the machined part from the first vise.

The method can include rotating the table 180° between the first position and the second position. The method can further include operating the robot to place the machined part picked from the first vise on an exit conveyor and operating the exit conveyor to remove the machined part from the enclosure. The method also can include operating the robot to move to a perch position after picking the another part and wait at the perch position until the machining tool has completed a predetermined portion of a machining process on the second raw part before placing the another raw part into the second vise. The method can include operating the machining tool to machine the another raw part in the second vise while the robot is picking the machined part from the first vise. The method can include performing the steps for a plurality of raw parts in succession to control the continuous machining process.

An apparatus for controlling a continuous machining process, according to the invention, includes: an enclosure with a machining tool mounted therein; a table mounted in the enclosure and being rotatable between a first position and a second position, the table having a first vise and a second vise for holding parts, and wherein first vise is adjacent to the machining tool in the first position and the second vise is adjacent to the machining tool in the second position; a raw parts supply mounted in the enclosure; and a robot mounted in the enclosure and positioned to pick a raw part from the raw parts supply, to place the raw part into the second vise when the table is in the first position and to place the raw part into the first vise when the table is in the second position.

The apparatus can include wherein the table is rotatable 180° between the first position and the second position. The apparatus also can include an exit conveyor extending into the enclosure for receiving a machined part picked by the robot from one of the first vise and the second vise. The apparatus further can include a controller connected to and controlling operations of the machining tool, the table and the robot.

In an alternate embodiment, the table can be fixed in the enclosure while each of the machining tool and the robot move between the first and second vises.

BRIEF DESCRIPTION OF THE SEVERAL VIEWS OF THE DRAWING

The above as well as other advantages of the invention will become readily apparent to those skilled in the art from the following detailed description of a preferred embodiment when considered in the light of the accompanying drawings in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
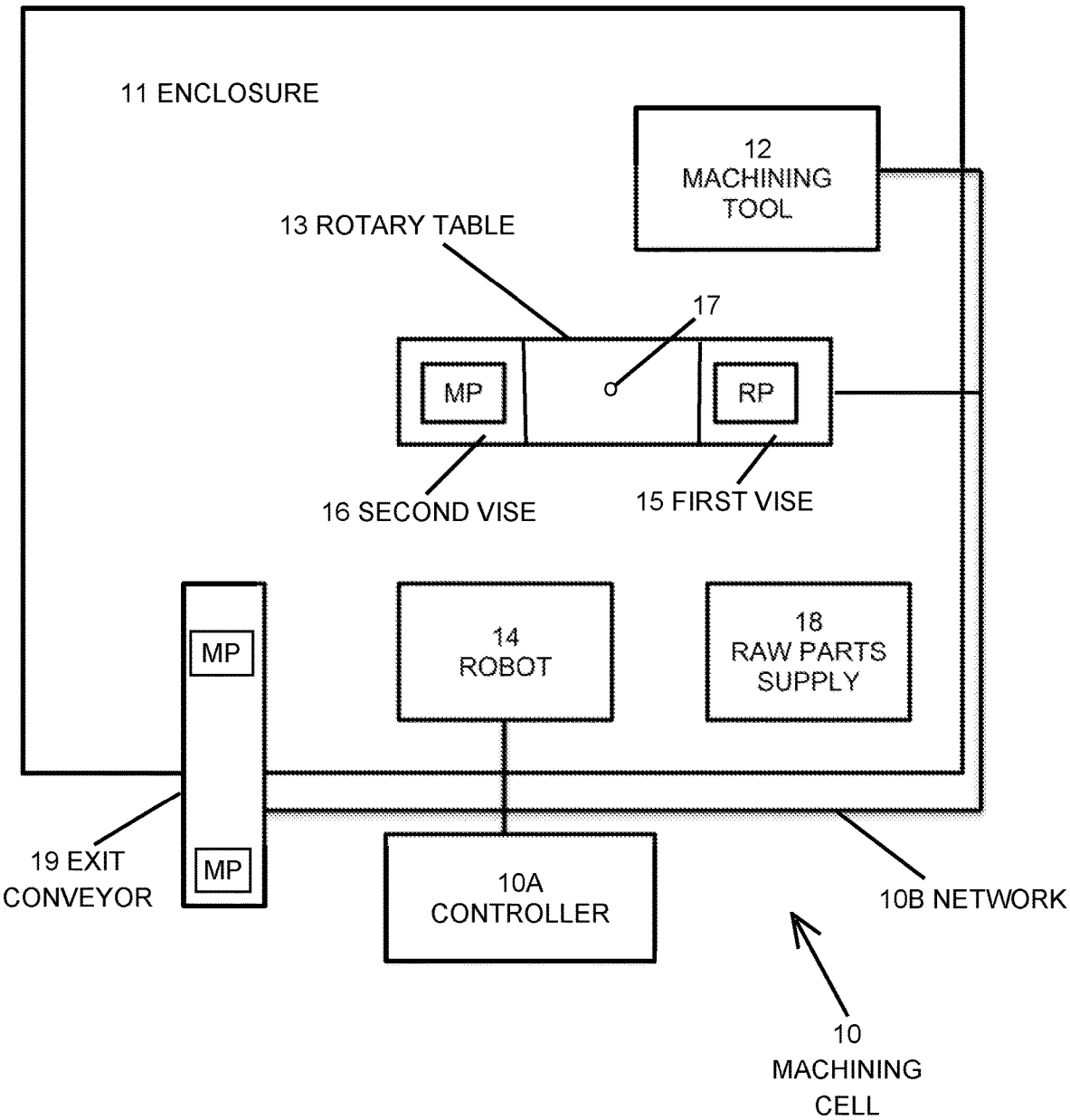
FIG. 1 is a schematic plan view of a part machining cell with a part transfer robot positioned inside the machine enclosure according to the invention.

FIG. 1 shows a machining cell 10 for machining parts according to the invention. The machining cell 10 includes an enclosure 11 inside which a machining tool 12, a rotary table 13 and a parts transfer robot 14 are mounted. The rotary table 13 includes a first vise 15 at one end positioned adjacent the machining tool 12. A second vise 16 is positioned at an opposite end of the table 13 adjacent the robot 14. The table 13 is rotatably mounted in the enclosure 11 at a pivot point 17 for 180° rotation. Thus, the table 13 can be rotated from the first position shown in FIG. 1 to a second position wherein the first vise 15 is adjacent the robot 14 and the second device 16 is adjacent the tool 12.

Also positioned inside the enclosure 11 is a parts supply 18 holding a plurality of raw parts RP. The robot 14 picks one of the raw parts RP from the supply and places the raw part into the first vise 15 when the table 13 is in the position shown in FIG. 1 or into the second vise 16 when the table is rotated 180°. During operation of the robot 14, the tool 12 is operated to machine a raw part RP into a machined part MP. When the machining operation is completed, the table 13 is rotated to position the machined part MP adjacent the robot 14 and the recently placed raw part RP adjacent the tool 12. Now the robot 14 can pick the machined part MP from the adjacent vise and place the machined part on an exit conveyor 19 to be moved outside of the enclosure 11.

A controller 10A is connected by a network 10B to the controlled components of the machining cell 10 for exchanging electrical signals to control and synchronize movement. These controlled components include the machining tool 12, the table 13, the robot 14 and the conveyor 19. The network 10B can be hardwired, wireless or a combination thereof. The controller 10A can be a single controller, a separate controller for each of the components, or a combination thereof. The controller 10A executes software operating the machining tool 12 to machine raw parts, rotating the table 13, operating the robot 14 to pick and place raw parts and machined parts, and operating the conveyor 19 to remove machined parts from the enclosure 11.

Figure 2:
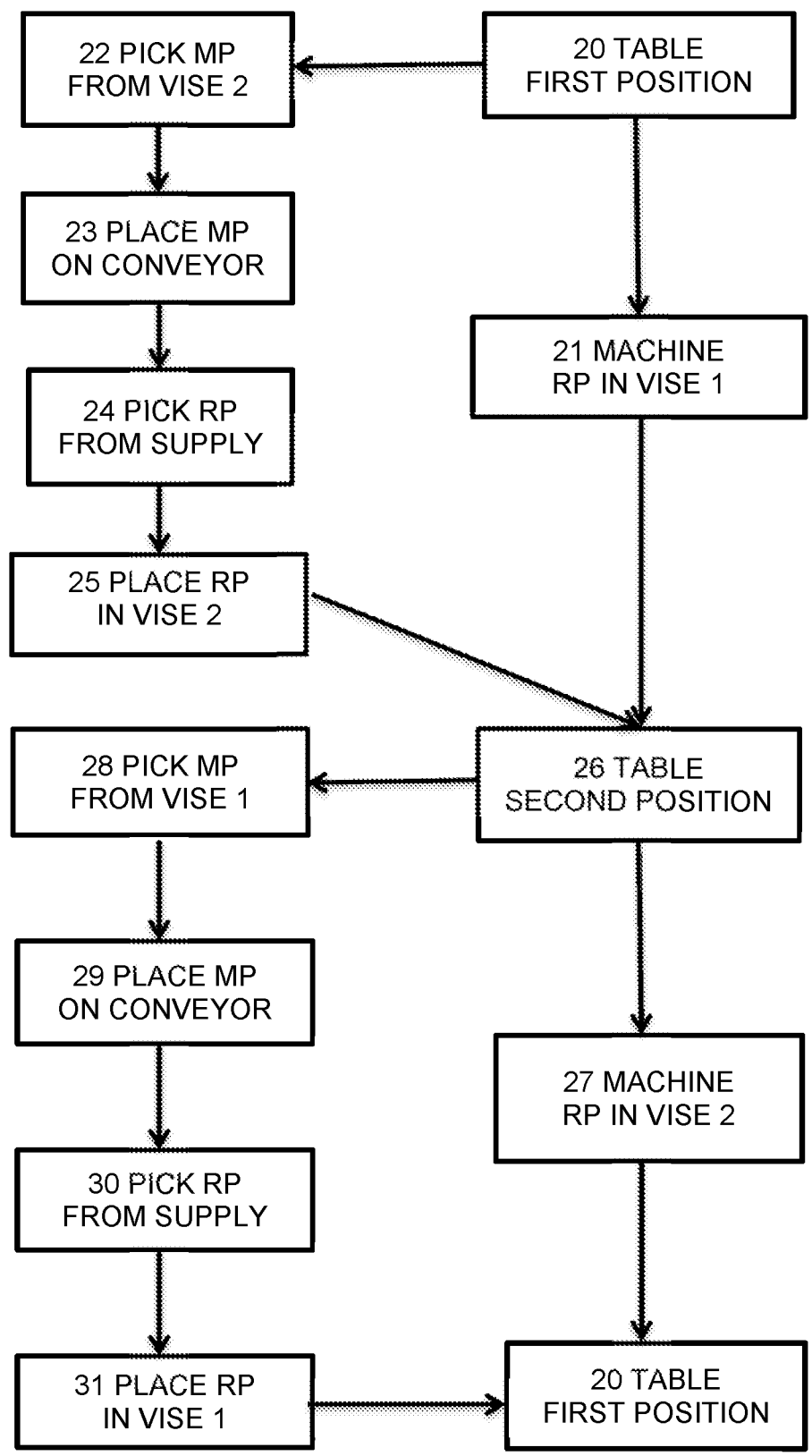
FIG. 2 is a flow diagram of a method of operating the robot shown in FIG. 1.

Referring to FIG. 2, there is shown a flow diagram of the method steps according to the invention performed under the direction of the controller 10A without opening an access door to the enclosure 11. FIG. 2 depicts a complete cycle of the method including two part machining cycles of the continuous machining process wherein a raw part in the first vise 15 is machined and then a raw part in the second vise 16 is machined. In a step 20, the table 13 is placed in the first position shown in FIG. 1. A raw part RP is retained in the first vise 15 and a machined part MP from a completed machining cycle is retained in the second vise 16. In a step 21, the machining tool 12 machines the raw part RP in the first vise 15. During the step 21, in a step 22, the robot 14 picks the machined part MP from the second vise 16. In a step 23, the robot 14 places the machined part MP on the exit conveyor 19.

In a step 24, the robot 14 picks a raw part RP from the supply 18, moves to a perch position in front of the dual part vises on the table 13, and waits for a permission signal from the controller 10A to load the adjacent vise. The timing of generation of the permission signal can be based upon the machining tool 12 having completed a predetermined portion of the machining process required to form the machined part MP. After receiving permission to load, in a step 25 the robot 14 places the raw part RP into the second vise 16 that is in the position shown in FIG. 1 and moves clear of the vise. Movement of the robot 14 is controlled by a tracking program running on the controller 10A that offsets the X and Y position of the table 13 via group inputs it gets from the machining tool 12 and modifies the load/unload position for the raw part. Concurrently, the machining tool 12 proceeds to machine the raw part that is in the first vise 15 in the step 21.

When the step 21 is completed such that the raw part RP in the first vise 15 has been machined into a machined part MP, the table 13 is rotated 180° to the second position in a step 26. While the machining tool 12 is machining the raw part in the second vise 16 in a step 27, the robot 14 picks the machined part from the first vise 15 in a step 28. In a step 29, the robot 14 places the machined part on the exit conveyor 19. The robot 14 then returns to the parts supply 18 and picks another raw part RP in a step 30. The robot 14 moves to the perch position and waits for the permission signal to load the first vise 15. When the machining process of the step 27 reaches the appropriate time in its cycle, the permission signal is sent to the robot 14 to load the first vise 15. The robot 14 calls the tracking program and proceeds to load the first vise 15 with the raw part RP in a step 31 while the machining tool 12 continues the step 27 of machining the part in the second vise 16. The robot 14 moves clear of the table 13 and waits for the permission to unload the machined part MP from the second vise 16 after the table 13 is rotated in a repeat of the step 20. The robot loading and unloading of parts and the machining of raw parts repeats until operation of the machining cell 10 is stopped. The machining tool 12 will run continuously as long as it has a supply of raw parts RP available. There is no reason to open an access door to the enclosure 11 during this continuous operation.

Figure 3:
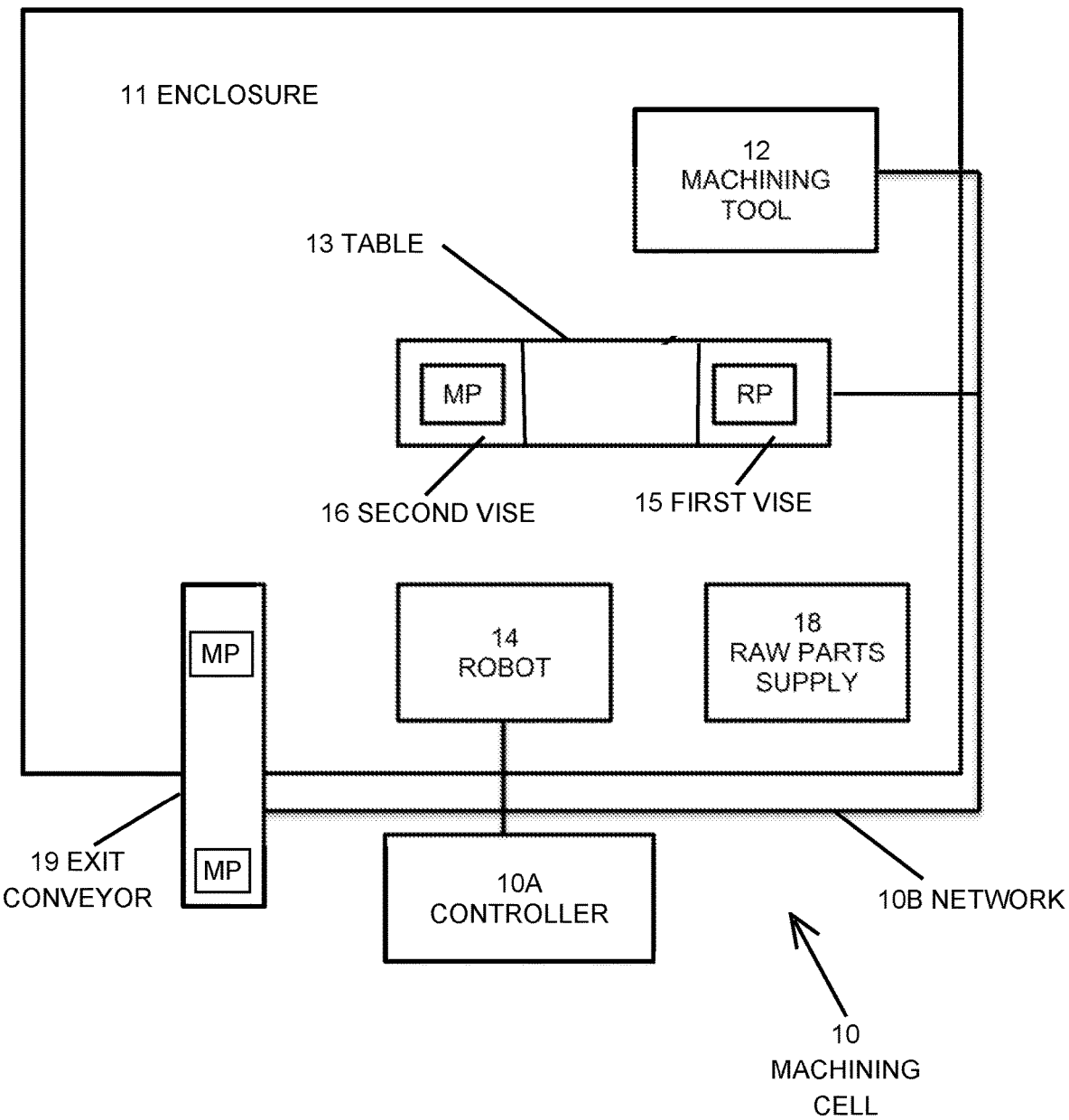
FIG. 3 is a schematic plan view of an alternate embodiment part machining cell with the part transfer robot positioned inside the machine enclosure according to the invention.

There is shown in FIG. 3 an alternate embodiment machining cell 10 according to the invention. A difference from the machining cell 10 shown in FIG. 1 is that the table 13 is fixed in position in the enclosure 11 rather than being rotatable. The only other difference from the machining cell 10 shown in FIG. 1 is that the machining tool 12 and the robot 14 can reach both the first vise 15 and the second vise 16 on the fixed table 13.

Figure 4:
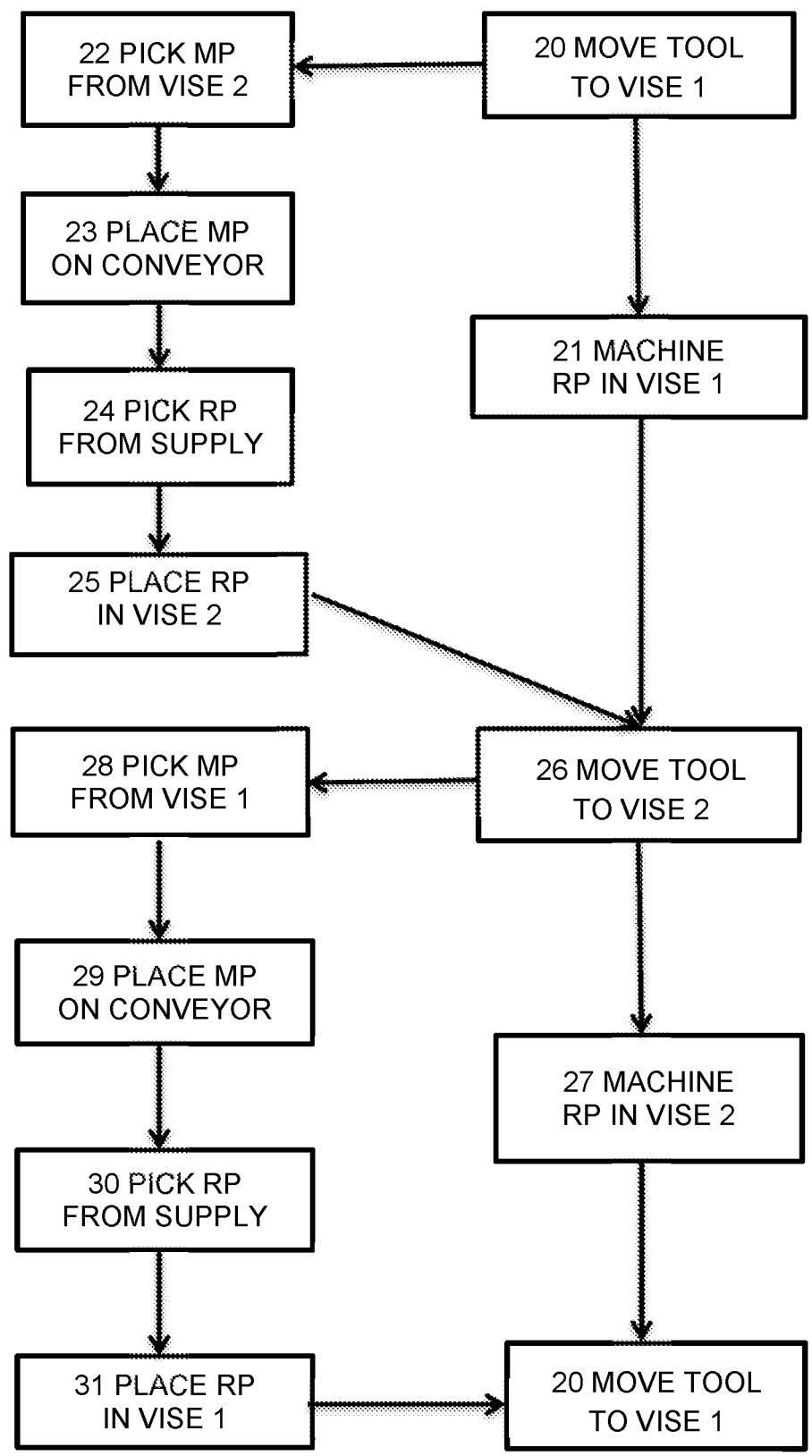
FIG. 4 is a flow diagram of a method of operating the robot shown in FIG. 3.

Referring to FIG. 4, there is shown a flow diagram of the method steps according to the invention for operating the machining cell 10 shown in FIG. 3. The method of FIG. 4 is similar to the method of FIG. 2 with the exception of the steps 20 and 26. In the step 20, the machining tool 12 is moved to the first vise 15 rather than rotating the table 13 to the machining tool as is done according to FIG. 2. In the step 26, the machining tool 12 is moved to the second vise 16 rather than rotating the table 13 to the machining tool as is done in FIG. 2. The method steps shown in FIG. 4 are performed under the direction of the controller 10A without opening an access door to the enclosure 11.

Although the tables 13 shown in FIGS. 1 and 3 have two vises 15 and 16, more than two vises can be provided and more than one table can be used.

In accordance with the provisions of the patent statutes, the invention has been described in what is considered to represent its preferred embodiment. However, it should be noted that the invention can be practiced otherwise than as specifically illustrated and described without departing from its spirit or scope.

The invention claimed is:

1. A method for performing a continuous machining process, comprising the steps of:
   mounting inside an enclosure a robot, a machining tool, a raw parts supply, and a table having a first vise and a second vise for holding parts, where the table is mounted directly to an inside of the enclosure via a stationary vertical pivot axis;
   operating the robot to pick a first raw part from the raw parts supply, place the first raw part into the second vise while the machining tool is machining a second raw part in the first vise, and then move clear of the second vise; and
   when the machining of the second raw part is complete thereby forming a machined part, operating the robot to pick the machined part from the first vise,
   wherein the table is rotatable about the stationary vertical pivot axis between a first position wherein the first vise is proximal the machining tool and the second vise is proximal the robot and a second position wherein the first vise is proximal the robot and the second vise is proximal the machining tool.

2. The method according to claim 1 including operating the robot to place the machined part picked from the first vise on an exit conveyor and operating the exit conveyor to remove the machined part from the enclosure.

3. The method according to claim 1 including operating the robot to place the first raw part in the second vise after the machining tool has completed a predetermined portion of a machining process on the second raw part.

4. The method according to claim 1 including operating the robot to move to a perch position after picking the first raw part and wait at the perch position until the machining tool has completed a predetermined portion of a machining process on the second raw part before placing the first raw part into the second vise.

5. The method according to claim 1 including repeating the steps of picking and placing the raw parts, machining the raw parts, and picking the machined parts for a plurality of the raw parts to perform the continuous machining process.

6. A method for controlling a continuous machining process, comprising the steps of:
   mounting inside an enclosure a robot, a machining tool, a raw parts supply, and a table having a first vise and a second vise for holding parts, where the table is mounted directly to an inside of the enclosure via a stationary vertical pivot axis;
   operating the machining tool to machine one raw part in the first vise;
   operating the robot to pick another raw part from the raw parts supply;
   operating the robot to place the another raw part into the second vise while the machining tool is machining the one raw part in the first vise, and to then move clear of the second vise; and
   when the machining of the one raw part is complete thereby forming a machined part, operating the robot to pick the machined part from the first vise,
   wherein the table is rotatable about the stationary vertical pivot axis between a first position wherein the first vise is proximal the machining tool and the second vise is proximal the robot and a second position wherein the first vise is proximal the robot and the second vise is proximal the machining tool.

7. The method according to claim 6 wherein the table is in the first position and is rotated to the second position when the machining of the one raw part is complete.

8. The method according to claim 6 including operating the robot to place the machined part picked from the first vise on an exit conveyor and operating the exit conveyor to remove the machined part from the enclosure.

9. The method according to claim 6 including operating the robot to move to a perch position after picking the another part and wait at the perch position until the machining tool has completed a predetermined portion of a machining process on the one raw part before placing the another raw part into the second vise.

10. The method according to claim 6 including operating the machining tool to machine the another raw part in the second vise while the robot is picking the machined part from the first vise.

11. The method according to claim 10 including performing the steps for a plurality of raw parts in succession to control the continuous machining process.

12. An apparatus for controlling a continuous machining process, comprising:
    an enclosure with a machining tool mounted therein;
    a table mounted in the enclosure and having a first vise and a second vise for holding parts to be machined into machined parts by the machining tool, where the table is mounted directly to an inside of the enclosure via a stationary vertical pivot axis;
    a raw parts supply mounted in the enclosure; and
    a robot mounted in the enclosure and positioned to pick a raw part from the raw parts supply and to place the raw part into a selected one of the first vise and the second vise,
    wherein the table is rotatable about the stationary vertical pivot axis between a first position wherein the first vise is proximal the machining tool and the second vise is proximal the robot and a second position wherein the first vise is proximal the robot and the second vise is proximal the machining tool.

13. The apparatus according to claim 12 including an exit conveyor extending into the enclosure for receiving a machined part picked by the robot from one of the first vise and the second vise.

14. The apparatus according to claim 12 including a controller connected to and controlling operations of the machining tool, the table and the robot.

\* \* \* \* \*